(12) United States Patent
Rugel

(10) Patent No.: US 10,489,859 B1
(45) Date of Patent: Nov. 26, 2019

(54) LIFE INSURANCE CLEARINGHOUSE

(71) Applicant: Allstate Insurance Company, Northbrook, IL (US)

(72) Inventor: John Rugel, Hawthorn Woods, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 14/013,106

(22) Filed: Aug. 29, 2013

(51) Int. Cl.
*G06Q 40/08* (2012.01)

(52) U.S. Cl.
CPC .................... *G06Q 40/08* (2013.01)

(58) Field of Classification Search
CPC ............... G06Q 40/08; G06Q 50/22
See application file for complete search history.

(56) References Cited

U.S. PATENT DOCUMENTS

| | | | | |
|---|---|---|---|---|
| 5,655,085 A * | 8/1997 | Ryan | ...................... | G06Q 40/02 705/4 |
| 5,873,066 A * | 2/1999 | Underwood | ........... | G06Q 40/02 705/2 |
| 6,526,386 B1 | 2/2003 | Chapman et al. | | |
| 7,124,112 B1 | 10/2006 | Guyan et al. | | |
| 7,771,275 B2 | 8/2010 | Walker et al. | | |
| 8,010,389 B2 * | 8/2011 | Wait | ....................... | G06Q 40/08 705/4 |
| 8,103,527 B1 * | 1/2012 | Lasalle | ................... | G06Q 40/08 705/35 |
| 8,234,561 B1 | 7/2012 | Bourdev | | |
| 8,346,648 B1 | 1/2013 | Kosmos | | |

(Continued)

FOREIGN PATENT DOCUMENTS

| | | |
|---|---|---|
| AU | 2004225177 A1 | 10/2004 |
| AU | 2006201029 A1 | 9/2006 |

(Continued)

OTHER PUBLICATIONS

Margolis, Phil, "ING introduces Life Insurance Capacity Calculator", May 19, 2010.*

(Continued)

*Primary Examiner* — Christopher Bridges
(74) *Attorney, Agent, or Firm* — Banner & Witcoff, Ltd.

(57) ABSTRACT

One or more devices in a life insurance clearinghouse system may be configured to store and maintain life insurance customer data and policy data in one or more life insurance databases. A life insurance clearinghouse may store, for example, customer information, policy types and terms, and coverage amounts for life insurance policies associated with multiple different life insurance providers. Various systems and devices, such as insurance provider computer hardware memory and processor systems, insurance clearinghouse computer memory and processor devices, and customer terminals, may retrieve life insurance customer data and/or policy data associated with multiple different life insurance providers, from one or more databases in a life insurance clearinghouse. The retrieved life insurance customer data and/or policy data may be analyzed and used in various life insurance determinations and functions, such as processing a life insurance application or a requested change to the coverage amount or terms of an existing policy, or determining maximum combined coverage amounts for customers.

19 Claims, 5 Drawing Sheets

(56) References Cited

U.S. PATENT DOCUMENTS

| | | | |
|---|---|---|---|
| 8,428,971 B2* | 4/2013 | Peterie | G06Q 40/08 705/35 |
| 8,463,624 B2* | 6/2013 | Hashim | G06Q 10/0633 705/4 |
| 2001/0034619 A1* | 10/2001 | Sherman | G06Q 30/02 705/4 |
| 2002/0022976 A1* | 2/2002 | Hartigan | G06Q 40/08 705/4 |
| 2002/0078216 A1* | 6/2002 | Pankovcin | G06F 17/30569 709/230 |
| 2002/0120477 A1 | 8/2002 | Jinnett | |
| 2002/0169750 A1 | 11/2002 | Eaton et al. | |
| 2004/0024619 A1 | 2/2004 | DiBella | |
| 2004/0170374 A1* | 9/2004 | Bender | G11B 27/031 386/232 |
| 2004/0204966 A1 | 10/2004 | Duffey et al. | |
| 2005/0222924 A1 | 10/2005 | Sumino et al. | |
| 2007/0127597 A1* | 6/2007 | Ammer | G06F 17/30572 375/324 |
| 2007/0192676 A1* | 8/2007 | Bodin | G06F 17/2264 715/205 |
| 2009/0089101 A1 | 4/2009 | Hashim | |
| 2009/0259496 A1 | 10/2009 | Olson et al. | |
| 2010/0324943 A1 | 12/2010 | Klibanow | |
| 2011/0046986 A1 | 2/2011 | Thomas et al. | |
| 2012/0143620 A1* | 6/2012 | Linetsky | G06Q 50/22 705/2 |
| 2013/0035964 A1* | 2/2013 | Roscoe | G06Q 10/10 705/4 |
| 2013/0066657 A1* | 3/2013 | Jenkins-Robbins | G06Q 40/08 705/4 |
| 2013/0096954 A1 | 4/2013 | Bodas | |
| 2013/0110554 A1* | 5/2013 | Rao | G06Q 40/08 705/4 |

FOREIGN PATENT DOCUMENTS

| | | | | |
|---|---|---|---|---|
| AU | 2002310349 | B2 | 10/2006 | |
| AU | 2007242441 | A1 | 11/2007 | |
| AU | 2011201723 | A1 | 5/2011 | |
| AU | 2011253656 | A1 | 12/2011 | |
| AU | 2010253917 | A1 | 1/2012 | |
| CA | 2518482 | A1 | 3/2007 | |
| WO | WO 95/03569 | * | 2/1995 | |
| WO | WO-9503569 | A2 * | 2/1995 | G06Q 40/02 |
| WO | 2002015090 | A1 | 2/2002 | |

OTHER PUBLICATIONS

Google search, "can you have multiple life insurance policieson one person", entire document.*

Voya Financial, "ING introduces Life Insurance Capacity Calculator", May 19, 2010, http://voya.mediaroom.com/2010-05-19-ING-Introduces-Life-Insurance-Capacity-Calculator; entire document. (Year: 2010).*

Term-Life-OnLine.com, "How Many Life Insurance Policies Can You Have?", Oct. 23, 2010, http://www.term-life-online.com/how-many-life-insurance-policies-can-you-have.html, entire document (Year: 2010).*

ING North America Insurance Corporation, "ING introduces Life Insurance Capacity Calculator", May 19, 2010, ING, p. 1.*

"Nebraska Insurance Reporting Guide"; Version 2.2; Date: Dec. 2012; retrieved from www.dmv.ne.gov.

Website: National Claims and Policies Database 1; "About the NCPD"; Retrieved: May 24, 2013; www.ncpd.apra.gov.au/Home/AboutNCPD.aspx.

Website: National Claims and Policies Database; "National Claims and Policies Database"; Retrieval Date: May 24, 2013; www.apra.gov.au/GI/Pages/national-claims-and-policies-database.aspx.

"CUE Claims and Underwriting Exchange"; Date: 2001; http://www.uk.experian.com/cue/objects/PartnerDataSheets2.pdf.

Website: Wisconsin Office of the Commission of Insurance; "Frequently Asked Questions About C.L.U.E."; Date: May 22, 2012; Date Retrieved: May 24, 2013.

Website: LV= Broker; "MID Explained"; Retrieval Date: May 24, 2013; www.lvbroker.co.uk/mid-explained/introduction/.

Website: Car Insurance Comparison; "Companies Record Car Accidents for Insurance Purposes"; Date: 2012; Retrieval Date: May 24, 2013; www.carinsurancecomparison.com/will-all-of-my-car-accidents-be-recorded-by-my-car-insurance-company/.

* cited by examiner

500

| | Customer | Insurance Provider | Policy Date | Policy Type | Policy Amount |
|---|---|---|---|---|---|
| 501 | Customer A | Provider X | 2/10/2005 | Whole | $1,000,000 |
| 502 | Customer A | Provider Y | 4/22/2006 | Term – 10 yr | $2,000,000 |
| 503 | Customer A | Provider Z | 12/18/2007 | Whole | $1,000,000 |
| 504 | Customer B | Provider Y | 1/18/2009 | Whole | $3,000,000 |
| 505 | Customer B | Provider Y | 1/18/2009 | Term – 2 yr | $1,500,000 |
| 506 | Customer C | Provider Z | 8/30/2010 | Universal | $500,000 |
| | ... | ... | ... | ... | ... |

| | Customer | Policies In-Force | Insurance Provider(s) | Combined Policy Amount |
|---|---|---|---|---|
| 601 | Customer A | 3 | X, Y, Z | $4,000,000 |
| 602 | Customer B | 2 | Y | $4,500,000 |
| 603 | Customer C | 1 | Z | $500,000 |
| | ... | ... | ... | ... |

FIG. 6

LIFE INSURANCE CLEARINGHOUSE

TECHNICAL FIELD

Various aspects of the disclosure generally relate to systems and methods of storing and analyzing life insurance policy data and customer data, and performing various actions relating to life insurance policies and applications based on the analysis of the life insurance policy data and customer data.

BACKGROUND

Life insurance is not only an important financial tool and investment strategy for many customers, but also provides customers with the security and peace of mind of knowing that they are protecting the financial futures of their families and loved-ones. Many different types of life insurance policies may exist between insurance providers (or insurers) and customers (or insureds), such as term life insurance (providing life insurance protection over a specific period of time), whole life insurance (providing permanent insurance for the lifetime of the insured, generally with fixed terms), or universal life insurance (similar to whole life insurance, with additional flexibility to allow customers to raise or lower premiums and coverage amounts during the lifetime of their policies). Different insurance providers may offer various different types of life insurance products, including different insurance types, terms, premiums, and coverage amounts, to meet the needs and investment goals of different customers.

Insurance providers may determine eligibility of different customers for different life insurance policies and terms (e.g., types, premiums, coverage amounts, term durations, investment flexibility, tax status, etc.), and may offer different policies and terms to different customers, based on various customer information, such as age, gender, income, health, and risk factors. In order to select appropriate life insurance policies and terms for customers, and to determine what policies and terms that different customers may be eligible for, insurance providers may ask customers to complete insurance applications, and to verify certain information such as income information and medical status.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to apparatuses, computer-implemented methods, and computer-readable media for storing and maintaining life insurance data in a life insurance clearinghouse comprising one or more life insurance databases. A life insurance clearinghouse may store, for example, customer information, policy types and terms, and coverage amounts for life insurance policies associated with multiple different life insurance providers. In certain examples, one or more databases in the life insurance clearinghouse may be updated when a new life insurance policy is obtained by a customer from an insurance provider, when the terms of an existing life insurance policy change, or when an existing life insurance policy is canceled or is no longer in-force.

In accordance with additional aspects of the disclosure, various devices and systems, such as insurance provider computer hardware memory and processor systems, insurance clearinghouse computer memory and processor devices, and customer terminals, may retrieve life insurance customer data and/or policy data associated with multiple different life insurance providers, from one or more databases of a life insurance clearinghouse. The retrieved life insurance customer data and/or policy data may be analyzed and used in various life insurance determinations and functions. In some examples, a life insurance provider may retrieve a customer's life insurance data from a life insurance clearinghouse to process a life insurance application, a requested change to the coverage amount or terms of an existing policy, or to determine a maximum combined coverage amount for a customer. In additional examples, a life insurance provider may analyze a customer's life insurance data to determine life insurance products for which the customer is eligible, such as life insurance policy types, terms, and coverage amounts for the customer.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIGS. 5-6 are illustrative tables showing example life insurance customer data and policy data, according to one or more aspects of the disclosure.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
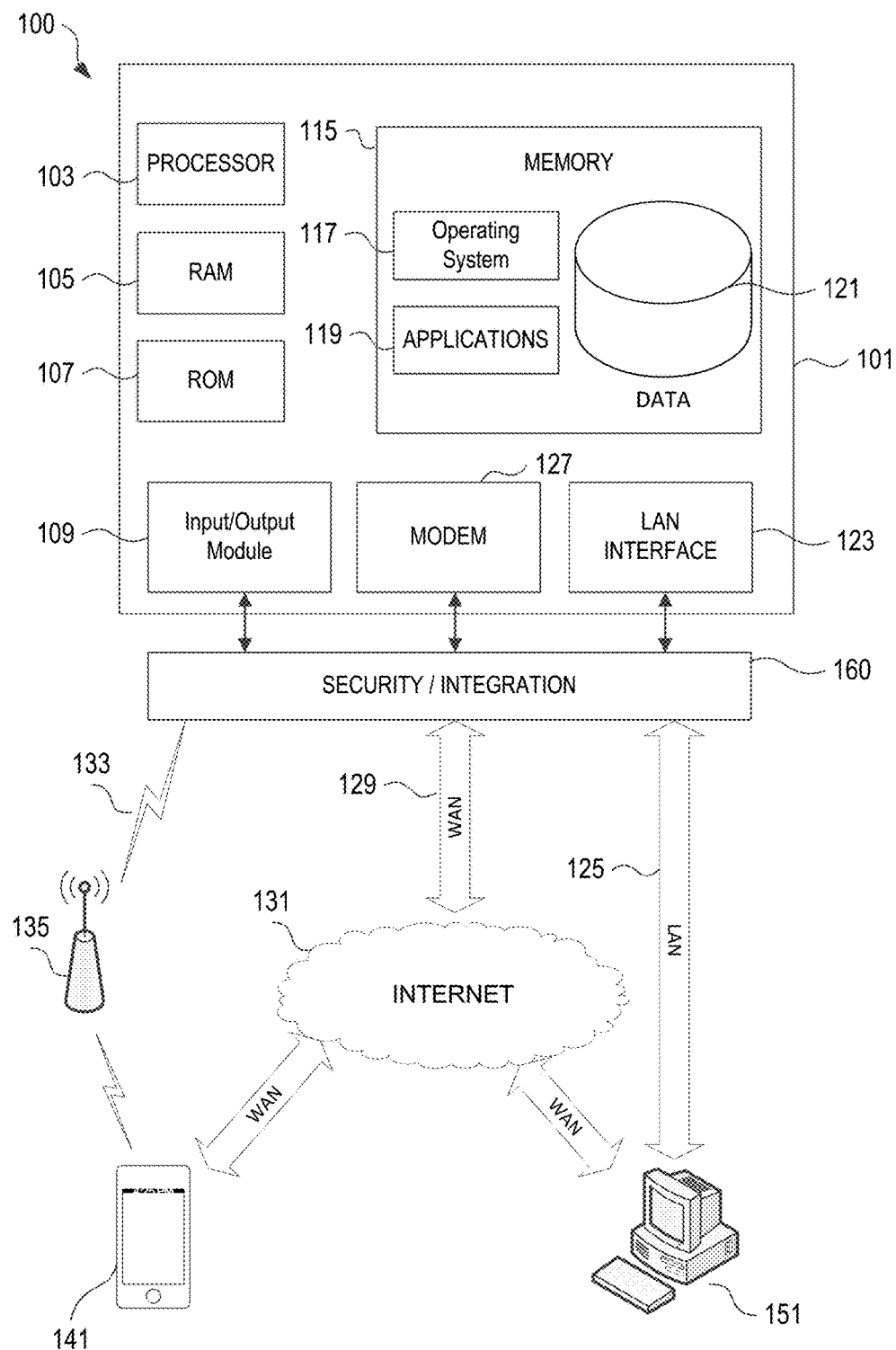
FIG. 1 illustrates a network environment and computer systems that may be used to implement aspects of the disclosure.

FIG. 1 illustrates a block diagram of a computing device (or system) 101 in a computer system 100 that may be used according to one or more illustrative embodiments of the disclosure. The device 101 may have a processor 103 for controlling overall operation of the device 101 and its associated components, including RAM 105, ROM 107, input/output module 109, and memory 115. The computing device 101, along with one or more additional devices (e.g., terminals 141 and 151, security and integration hardware 160) may correspond to any of multiple systems or devices, such as an insurance clearinghouse device or system, a life insurance provider device or system, or a customer device or system, configured as described herein for maintaining and analyzing life insurance customer data and policy data, and perform various life insurance determinations and actions based on the life insurance customer data and policy data.

Input/Output (I/O) 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various actions. For example, memory 115 may store software used by the device 101, such as an operating system 117, application programs 119, and an associated internal database 121. The various hardware memory units in memory 115 may include volatile and nonvolatile, removable and non-removable media implemented in any method or technology for storage of information such as computer readable instructions, data structures, program modules or other data. In some examples, one or more nonvolatile hardware memory units having at least 5 gigabytes (GB) of memory may be used in device 101, in order to support sufficient numbers of life insurance policy and customer records in certain embodiments of life insurance clearinghouse systems. Memory 115 also may include one or more physical persistent memory devices and/or one or more non-persistent memory devices. Memory 115 may include, but is not limited to, random access memory (RAM) 105, read only memory (ROM) 107, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 103.

Processor 103 may include a single central processing unit (CPU), which may be a single-core or multi-core processor (e.g., dual-core, quad-core, etc.), or may include multiple CPUs. Processor(s) 103 may have various bit sizes (e.g., 16-bit, 32-bit, 64-bit, 96-bit, 128-bit, etc.) and various processor speeds (ranging from 100 MHz to 5 Ghz or faster).

Processor(s) 103 and its associated components may allow the system 101 to execute a series of computer-readable instructions, for example, to store and update life insurance customer and policy data in a clearinghouse, retrieve and analyze customer life insurance data from a clearinghouse, and perform various life insurance determinations and actions using the customer life insurance data, such as processing life insurance applications or requested changes to existing policies, or determining maximum combined coverage amounts for customers.

The computing device (e.g., a customer terminal, an insurance provider computer hardware memory and processor system, an insurance clearinghouse computer memory and processor device, etc.) may operate in a networked environment 100 supporting connections to one or more remote computers, such as terminals 141 and 151. The terminals 141 and 151 may be personal computers, servers (e.g., web servers, database servers), or mobile communication devices (e.g., mobile phones, portable computing devices, and the like), and may include some or all of the elements described above with respect to the computing device 101. The network connections depicted in FIG. 1 include a local area network (LAN) 125 and a wide area network (WAN) 129, and a wireless telecommunications network 133, but may also include other networks. When used in a LAN networking environment, the computing device 101 may be connected to the LAN 125 through a network interface or adapter 123. When used in a WAN networking environment, the device 101 may include a modem 127 or other means for establishing communications over the WAN 129, such as network 131 (e.g., the Internet). When used in a wireless telecommunications network 133, the device 101 may include one or more transceivers, digital signal processors, and additional circuitry and software for communicating with wireless computing devices 141 (e.g., mobile phones, portable customer computing devices) via one or more network devices 135 (e.g., base transceiver stations) in the wireless network 133.

Also illustrated in FIG. 1 is a security and integration layer 160, through which communications are sent and managed between the life insurance clearinghouse device 101 and the remote devices (141 and 151) and remote networks (125, 129, and 133). The security and integration layer 160 may comprise one or more computing devices, such as web servers, authentication servers, and various networking components (e.g., firewalls, routers, gateways, load balancers, etc.), having some or all of the elements described above with respect to the computing device 101. As an example, security and integration layer 160 may comprise a set of web application servers configured to use secure protocols and to insulate the life insurance clearinghouse servers 101 from external devices 141 and 151. In some cases, the security and integration layer 160 may correspond to a set of dedicated hardware and/or software operating at the same physical location and under the control of same entities as the life insurance clearinghouse servers and devices 101. For example, layer 160 may correspond to one or more dedicated web servers and network hardware in a life insurance clearinghouse datacenter or in a cloud infrastructure supporting a cloud-based life insurance clearinghouse. In other examples, the security and integration layer 160 may correspond to separate hardware and software components which may be operated at a separate physical location and/or by a separate entity.

As discussed below, the data transferred to and from a computing device 101 in a life insurance clearinghouse may include secure and sensitive data, such as insurance customer and policy data. Therefore, it may be desirable to protect the data transmission by using secure network protocols and encryption, and also to protect the integrity of the data stored when on the life insurance clearinghouse server(s) 101 using the security and integration layer 160 to authenticate users and restrict access to unknown or unauthorized users. In various implementations, security and integration layer 160 may provide, for example, a file-based integration scheme or a service-based integration scheme. In filed-based integration, data files may be transmitted to and from the life insurance clearinghouse server(s) 101 through the security and integration layer 160, using various network communication protocols. Secure data transmission protocols and/or encryption may be used in file transfers to protect to integrity of the life insurance clearinghouse data, for example, File Transfer Protocol (FTP), Secure File Transfer Protocol (SFTP), and/or Pretty Good Privacy (PGP) encryption.

In service-based integration, one or more web services may be implemented within the life insurance clearinghouse system 101 and/or security and integration layer 160. The web services may be accessed by authorized external devices and users to support input, extraction, and manipulation of the data in the life insurance clearinghouse server(s) 101. Web services built to support to the life insurance clearinghouse may be cross-domain and/or cross-platform, and may be built for enterprise use. Such web services may be developed in accordance with various web service standards, such as the Web Service Interoperability (WS-I) guidelines. In some examples, a life insurance clearinghouse web service may be implemented in the security and integration layer 160 using the Secure Sockets Layer (SSL) or Transport Layer Security (TLS) protocol to provide secure connections between life insurance clearinghouse servers 101 and various clients 141 and 151 attempting to insert or manipulate data within the clearinghouse. SSL or TLS may use HTTP or HTTPS to provide authentication and confidentiality. In other examples, a life insurance clearinghouse web service may be implemented using the WS-Security standard, which provides for secure SOAP messages using XML encryption. In still other examples, the security and integration layer 160 may include specialized hardware for providing secure web services. For example, secure network appliances in the security and integration layer 160 may include built-in features such as hardware-accelerated SSL and HTTPS, WS-Security, and firewalls. Such specialized hardware may be installed and configured in the security and integration layer 160 in front of the web servers, so that any external devices may communicate directly with the specialized hardware.

Although not shown in FIG. 1, various elements within memory 115 or other components in system 100, may include one or more caches, for example, CPU caches used by the processing unit 103, page caches used by the operating system 117, disk caches of a hard drive, and/or database caches used to cache content from database 121. For embodiments including a CPU cache, the CPU cache may be used by one or more processors in the processing unit 103 to reduce memory latency and access time. In such examples, a processor 103 may retrieve data from or write data to the CPU cache rather than reading/writing to memory 115, which may improve the speed of these operations. In some examples, a database cache may be created in which certain data from a database 121 (e.g., a life insurance clearinghouse database) is cached in a separate smaller database on an application server separate from the database server. For instance, in a multi-tiered application, a database cache on an application server can reduce data retrieval and data manipulation time by not needing to communicate over a network with a back-end database server. These types of caches and others may be included in various embodiments, and may provide potential advantages in certain implementations of life insurance clearinghouse systems, such as faster response times and less dependence on network conditions when accessing the life insurance clearinghouse system to update or retrieve insurance policy information, or processing requests for new insurance policies or policy changes.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computer devices and life insurance clearinghouse system components described herein may be configured to communicate using any of these network protocols or technologies.

Additionally, one or more application programs 119 may be used by the computing device 101 within a life insurance clearinghouse system, including computer executable instructions for receiving and processing life insurance applications and requested changes to existing policies (e.g., using web-based life insurance application forms, insurance application processing algorithms, etc.), maintaining, retrieving and analyzing customer life insurance data (e.g., life insurance database update programs, customer life insurance data analysis programs, etc.), and performing other related functions as described herein.

Figure 2:
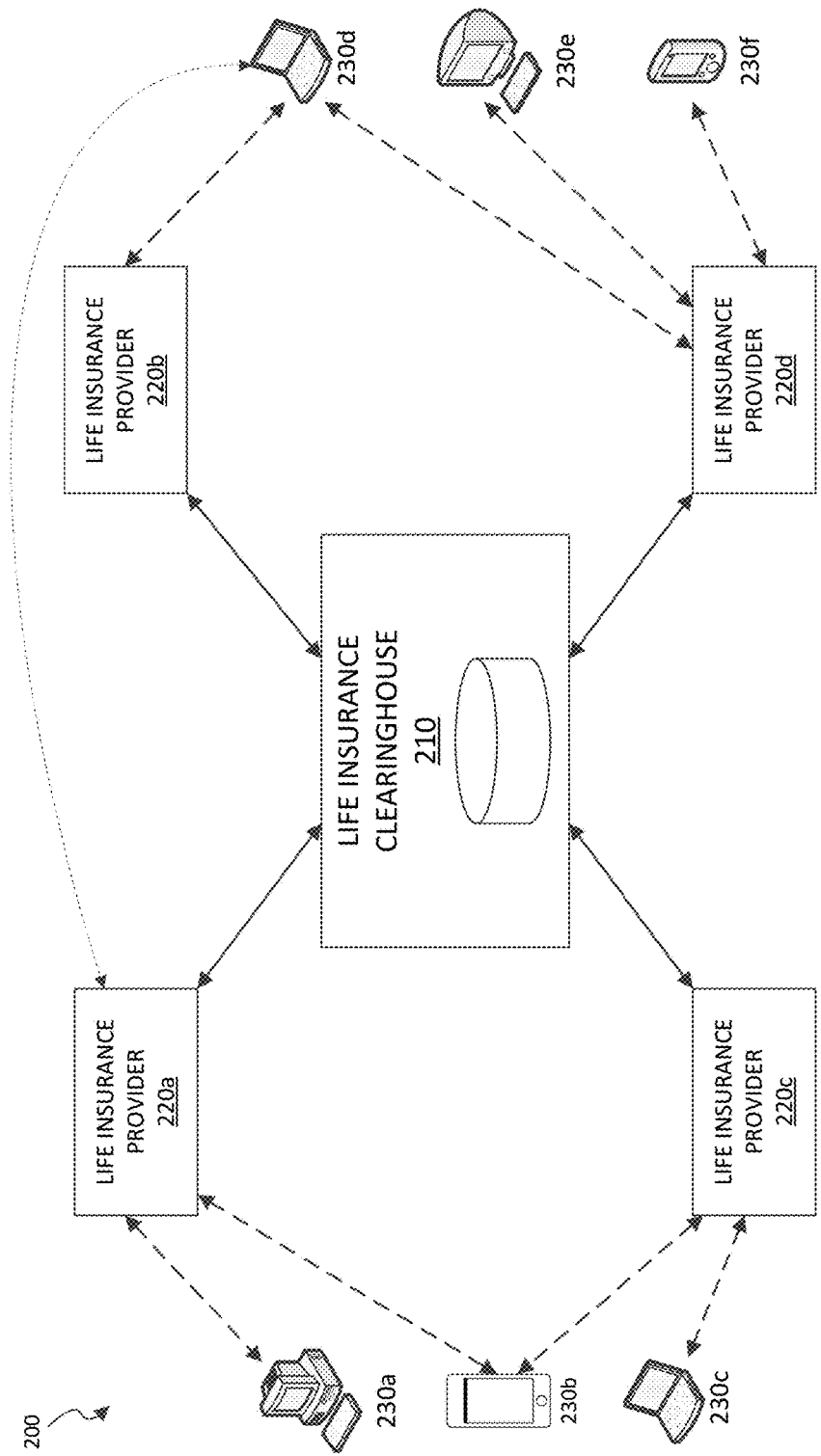
FIG. 2 is a diagram illustrating various components of a life insurance clearinghouse system, according to one or more aspects of the disclosure.

FIG. 2 is a diagram of an illustrative life insurance clearinghouse system 200. In the example life insurance clearinghouse system 200, a life insurance clearinghouse 210 may communicate with a plurality of different life insurance providers 220, each of which may communicate with one or more customer terminals 230. Each component shown in FIG. 2 may be implemented in hardware, software, or a combination of the two. Additionally, each component of the life insurance clearinghouse system 200 may include a computing device (or system) having some or all of the structural components described above for computing device 101.

Customer terminals 230a-230f may include any computing systems and devices, such as personal computers, mobile devices (e.g., smartphones, personal digital assistants, etc.) laptop computers, tablets, or computer servers, that may be used by a current or potential insurance customer to communicate with an insurance provider. As discussed in more detail below, client software applications executing on customer terminals 230 may provide the functionality for users/customers to establish connections with insurance provider servers 220, receive life insurance policy offers from life insurance providers and present the offers to via user interfaces, receive and submit customer data (e.g., life insurance applications, requests for changes to existing applications) from users/customers to insurance providers, and receive and present related responses (e.g., notifications of accepted or rejected applications or change requests, counteroffers from insurance providers, etc.). In order to facilitate communication with insurance providers 220 and other insurance-related devices, customer terminals 230 may include one or more client software applications configured to establish a communication session with an insurance provider server 220 and to allow a user to perform various insurance-related actions, for example, a web browser (e.g., for web-browser based communication with insurance providers and other entities), a web-based mobile application (e.g., a mobile platform-based software application developed and published by an insurance company, reinsurance company, financial institution, or other entity), or a stand-alone application (e.g., a non-web-based software application executable on a customer terminal 230).

The life insurance clearinghouse system 200 shown in FIG. 2 also includes a plurality of insurance providers 220a-220d. The insurance providers 220 may correspond to devices or systems operated by different insurance providers (e.g., different insurance companies, reinsurance companies, financial institutions, etc.). Each insurance provider 220 may be implemented using one or more individual computer servers (e.g., web servers, application servers, authentication servers, database servers, etc.), or combinations of servers and/or other computing devices. Such insurance provider servers 220 may include various software and hardware components configured to communicate with various customer terminals 230, as well as with one or more life insurance clearinghouses 210. For example, insurance provider servers 220 may include software applications and modules to provide server-side functionality (e.g., web server or application server) to support clients and provide insurance-related functionality to customers at terminals 230. For instance, insurance provider servers 220 may include software for establishing connections with customer terminals 230, receiving identification data and policy data from customers or potential customers, identifying and authenticating customers, providing insurance applications (e.g., web-based applications, change request forms, questionnaires, etc.) and processing the applications, determining various insurance policy types and terms for which different customers are eligible, and communicating with customers via terminals 230 to negotiate policy types and terms, establish policies, activate and deactivate policies, etc. Additionally, as discussed below, insurance provider servers 220 may be configured to determine life insurance customer data and policy data based on various interactions with customers, and then provide the life insurance customer data and policy data to one or more life insurance clearinghouses 210. Insurance provider servers 220 also may include software applications or modules to retrieve life insurance customer and/or policy data from life insurance clearinghouses 210, analyze the data, and perform various determinations and actions (e.g., processing life insurance applications and requests for changes to existing policies) based on the analysis of the data from life insurance clearinghouse(s) 210.

The life insurance clearinghouse system 200 shown in FIG. 2 also includes a life insurance clearinghouse 210. In this example, the life insurance clearinghouse 210 may be a single central computer system comprising one or more computing devices (e.g., application servers, database servers) configured to store and maintain life insurance customer and policy data associated with a plurality of different life insurance providers. In other examples, multiple life insurance clearinghouses 210 may be established and maintained, each of which may be configured to communicate with one or more insurance provider servers 220, customer terminals 230, and/or other life insurance clearinghouses 210, so that the multiple life insurance clearinghouses 210 collectively store and maintain life insurance customer and policy data associated with different life insurance providers. As shown in FIG. 2, the life insurance clearinghouse 210 may include one or more databases configured to store the life insurance customer and policy data received from multiple different insurance providers. Such databases may be implemented using specialized database servers and database software, or may be implemented using other computerized storage techniques (e.g., spreadsheets, text-based storage, etc.). As discussed above, the life insurance clearinghouse 210 (or multiple life insurance clearinghouses 210) each may include a security and integration layer 160 to assure data security and integrity by controlling access to and transmission of life insurance data to or from the clearinghouses 210. Life insurance clearinghouse systems and/or security and integration layers 160 may implement file-based or service-based integration schemes.

As discussed below, insurance customers (e.g., current and/or potential customers) may obtain multiple different life insurance policies, at different times, and from different insurance providers. Accordingly, the life insurance clearinghouse 210 may be configured to receive and store life insurance data (e.g., customer information, policy information, etc.) from multiple insurance providers 220 and/or other data sources, so that the clearinghouse 210 may compile and maintain data corresponding to a customer's multiple policies, even when such data is not known to or stored by any single insurance provider 220.

In some examples, the life insurance clearinghouse 210 may store data associated with different insurance providers in different logical or physical storage locations. For instance, life insurance policy data received from a first insurance provider server 220a may be stored in a different table, file, or on a different database server than life insurance policy data received from a second insurance provider server 220b. Such examples may be implemented in order to preserve data integrity and maintain security and privacy for the insurance providers 220 and customers. In other examples, data from different insurance providers 220 may be stored in a life insurance clearinghouse 210 in a uniform manner and within the same logical and/or physical storage locations. For example, as shown in FIGS. 5 and 6, life insurance customer data and policy data from multiple different insurance providers may be stored in the same format and in the same tables 500 and 600. In some cases, the life insurance data from different insurance provider servers 220 may be received in different data formats and/or data types, and the life insurance clearinghouse 210 may first convert the data into a uniform type and format before storing the data within its life insurance databases.

In certain embodiments, the life insurance clearinghouse 210 may be stored in a datacenter maintained by one or more insurance providers 220. For example, a single insurance provider 220a may maintain and provide to a life insurance clearinghouse 210 at a datacenter, and may allow other insurance providers 220b-220d to register as authorized users with access to the life insurance clearinghouse 210. In other embodiments, the life insurance clearinghouse 210 may be stored and maintained by a third-party datacenter, or by a cloud provider using cloud-based technologies. For instance, a cloud provider may store and provide access to a life insurance clearinghouse 210 for a plurality of insurance providers 220a-220d, such that the clearinghouse databases are stored at remote off-site locations, and are made accessible to the insurance providers 220 via virtual machines. In such implementations, the cloud provider may provide the data storage for the life insurance clearinghouse in a secure and scalable remote system. The cloud provider may be a separate entity from any of the insurance providers 220, so that each insurance provider may send its secure policy and customer data to a third-party cloud provider rather than to another insurance provider 220. Additionally, using cloud-based technologies, the size of the life insurance clearinghouse may be easily increased or decreased by allocating or deallocating cloud storage resources, without the need to purchase and install additional hardware into a datacenter.

Additionally, the life insurance clearinghouse 210 may be configured to compile and group life insurance data for individual customers, as shown in FIG. 6, so that multiple life insurance policies obtained by a single customer from different insurance providers may be reflected in a single combined record. Such combined records may include, for example, a combined number of life insurance policies for a single customer, a combined listing of life insurance providers for a single customer, and a combined life insurance policy amount for a single customer. In some examples, life insurance policy data may be compiled and grouped into data records corresponding to groups of individuals, for example, spouses, nuclear or extended families, or members of a business or organization, so that records may be stored in the life insurance clearinghouse 210 representing the combined life insurance policies, coverage amounts, and terms and for any group, family, company, organization, and the like.

In some embodiments, the life insurance clearinghouse 210 may be implemented as a database storing life insurance customer data and policy data associated with different insurance providers, but might not provide any additional data analysis and functionality. In such embodiments, insurance provider servers 220 and other computing devices (e.g., customer terminals 230) may retrieve data (e.g., using database queries) from the life insurance clearinghouse 210, and then may analyze the retrieved data to perform various life insurance-related actions such as determining life insurance eligibility and terms for customers, processing (and then accepting or rejecting) life insurance applications or requests for policy changes submitted by customers, determining counteroffers for potential life insurance customers, determining maximum coverage amounts for customers, etc. Because different insurance providers 220 may implement different techniques and algorithms for determining life insurance eligibility for customers, processing insurance applications and requests for changes to existing policies, determining maximum combined coverage amounts, and the like, it may be advantageous in some cases to configure the life insurance clearinghouse 210 only to provide life insurance customer and policy data and not to perform additional analysis (e.g., processing applications or policy change requests, determining maximum coverage amounts, etc.).

In other embodiments, the life insurance clearinghouse 210 may be configured to perform certain data analysis and functionality, in addition to storing the life insurance customer and policy data. In such cases, the life insurance clearinghouse 210 may perform any life insurance-related action that may otherwise be performed by an insurance provider 220 or other computing device, such as determining life insurance eligibility and terms for customers, processing life insurance applications and requests for changes to existing policies, determining counteroffers, determining maximum combined coverage amounts for customers, etc. For example, an insurance provider server 220 may receive customer data from customer terminal 230, and submit the data to the life insurance clearinghouse 210 which may process and analyze the customer data and return one or more specific values or results to the insurance provider server 220 (e.g., an indication of acceptance of rejection of a life insurance application or policy change request, a maximum combined coverage amount for the customer, etc.). In certain cases, it may be advantageous to have the life insurance clearinghouse 210 perform some (or all) of the data analyses and life insurance determinations, so that life insurance policy data associated with one insurance provider (e.g., customer identities, coverage amounts, terms, etc.) is not shared with other insurance providers.

Figure 3:
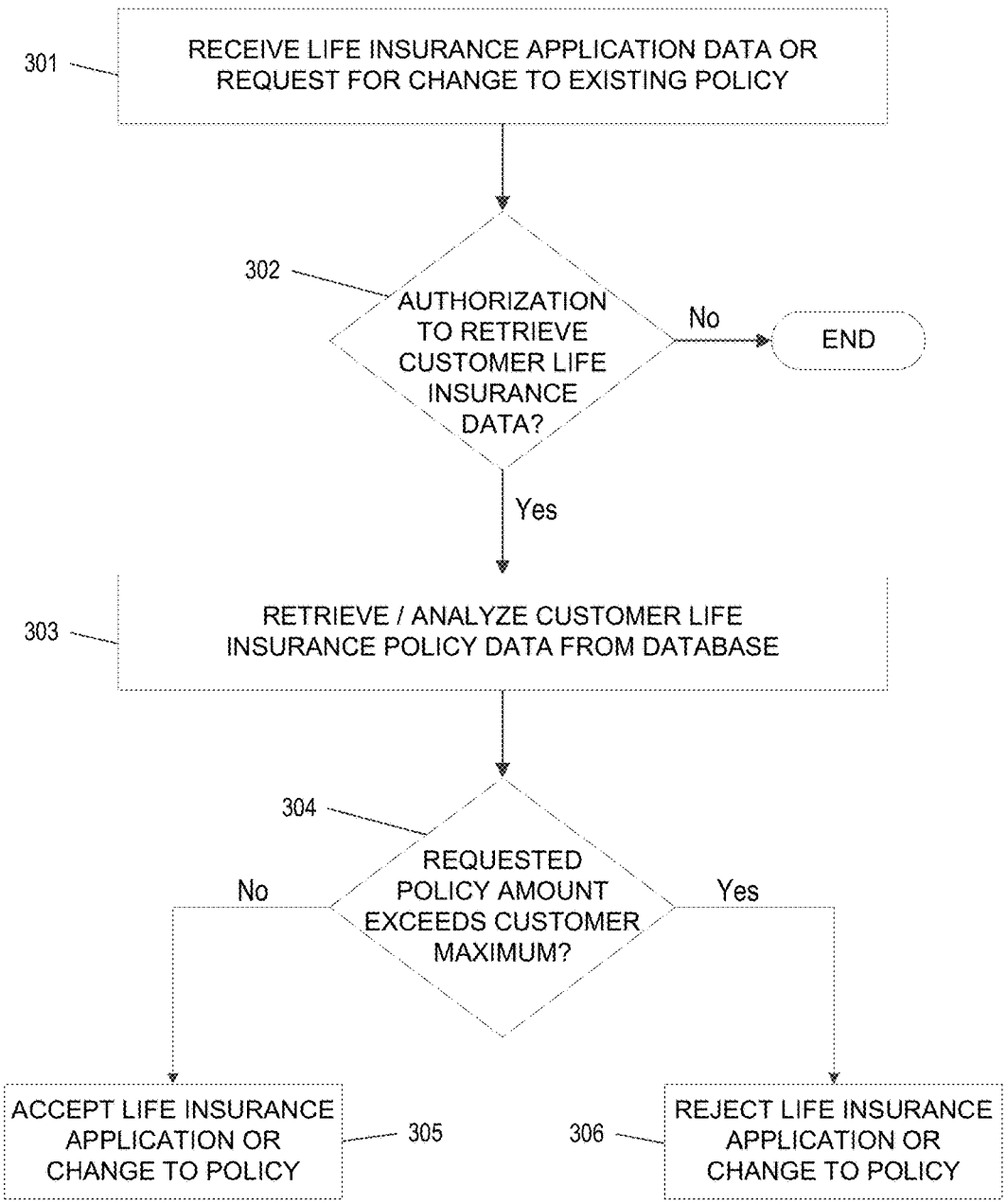
FIG. 3 is a flow diagram illustrating an example of receiving and processing an life insurance application or requested change to an existing life insurance policy, using customer life insurance policy data from a life insurance database, according to one or more aspects of the disclosure.

Referring now to FIG. 3 a flow diagram is shown illustrating a process of receiving and processing a life insurance application from a customer or a request for a change to an existing life insurance policy. Various embodiments and examples described below in connection with FIG. 3 may be performed by an insurance provider computing device (e.g., insurance provider servers 220), by a life insurance clearinghouse 210, by software executing at a customer terminal 230, or by a combination of these devices or other devices in a life insurance clearinghouse system.

In step 301, life insurance application data, or data requesting a change to an existing policy, is received at a computing device, such as an insurance provider server 220 or other computing device in a life insurance clearinghouse system. For example, the life insurance policy data received in step 301 may correspond to an existing customer logging into (e.g., via customer terminal 230) an insurance provider server 220 to submit an application for a new life insurance policy, access the details of a current life insurance policy, and/or request changes to a current policy (e.g., a higher or lower coverage amount, higher or lower premium amounts, changes in length of term, etc.). In other examples, the data received in step 301 may correspond to a potential customer accessing (e.g., via customer terminal 230) an insurance provider server 220 to submit an application for a new life insurance policy, or to express interest in receiving an offer for a life insurance policy from the insurance provider 220. The data received in step 401 may include information identifying the customer or potential customer (e.g., the customer's name, address, phone number, email address, driver's license number, social security number, and/or the customer's current insurance providers, accounts, login credentials, and policy numbers, etc.). When a current or potential customer is applying for a new life insurance policy, the information submitted by the customer also may include various demographic information (e.g., age, gender, height, marital status, etc.), professional data (e.g., occupation, income, etc.), and personal and health data (e.g., medical conditions and records, exercise habits, hobbies, etc.), along with an indication of the life insurance policy and/or terms that the customer is interested in obtaining (e.g., a policy type, premium amount, term length, coverage amount, etc.). In certain examples, the data in step 301 may be transmitted in accordance with a predetermined data format, such as an Association for Cooperative Operations Research and Development (ACCORD) insurance data standard, or other predetermined format suitable for storing and transmitting life insurance data. In such cases, various insurance providers 220 interacting with the life insurance clearinghouse 210 may communicate insurance data via a common format (e.g., ACCORD XML) to support data integrity and to more easily allow different insurance providers to access the clearinghouse 210.

In some examples, the life insurance application data or request for policy change received in step 301 may be received from a customer terminal 230, for example, in an email, web-browser based forms, a web-based insurance application, or the like, over a computer network. The life insurance application data also may be received over other media and using other techniques, such as by scanning and parsing hard copies of insurance application forms, or an automatic voice response unit (VRU) during a telephone interaction with a current customer or potential customer. As discussed above, in some embodiments, specialized hardware and/or software in the life insurance clearinghouse system 101, or in a separate security and integration layer 106, may be used to manage secure communications between the life insurance clearinghouse 210 and life insurance providers 220 or other external devices or systems. Thus, the life insurance data received in step 301 may comprise one or more data files transferred in accordance with a filed-based integration system implemented for the life insurance clearinghouse 210. In such cases, an insurance provider 220 may transmit a file using secure protocols and/or encryption, such as SFTP or FTP with PGP encryption. The life insurance data received in step 301 also may be received via a web service developed in accordance with a service-based integration scheme provided by a life insurance clearinghouse system and/or a separate security and integration layer 106. As discussed above, a secure webservice may use protocols and standards such as SSL or TLS, HTTP or HTTPS, SOAP with XML encryption, to allow for the secure transfer of life insurance policy and/or customer data in step 301.

Additionally, step 301 may include verification of the received data and/or authentication of the identity or device from which the data was received. In some examples, different insurance providers 220a-200d may be required to register for access to the life insurance clearinghouse 201. In such examples, hardware and/or software components within the life insurance clearinghouse 201 or within a separate security and integration layer 106 may verify that the user or device attempting to transmit insurance data in 301 has the correct authentication credentials for the requested data transmission. For instance, the user's authentication credentials may be validated via SFTP during an attempted file transfer, SSL or HTTPS via a web service, or using other authentication techniques.

Although the example shown in FIG. 3 describes receiving and processing (e.g., accepting or rejecting) a life insurance application or a request to change an existing life insurance policy, similar techniques may be used in other examples to determine a life insurance policy and terms to be offered (or counteroffered) to a customer, rather than only accepting or rejecting the application or change request submitted by a customer. In some cases, the customer might only provide certain identifying information (e.g., a name, email address, or social security number, etc.) in step 301, and techniques similar to those described below in steps 302-306 may be used to determine a life insurance product type, a coverage amount, and other life insurance terms appropriate for the customer and for which the customer is eligible, and then to offer the life insurance product(s) to the customer.

In step 302, one or more devices and/or software components (e.g., insurance provider server 220, life insurance clearinghouse computing device 210) may determine whether or not authorization has been provided by the customer to retrieve the customer's life insurance data from one or more life insurance databases. Step 302 may be optional in certain embodiments, and customer authorization need not be obtained before attempting to retrieve the customer's life insurance data from the life insurance database(s) in step 303. In examples where customer authorization is verified in step 302, based on consumer protection laws, insurance provider policies, etc., the customer's authorization may be obtained with the life insurance application data or policy change request data in step 301, or via a separate customer interaction. For instance, when submitting a web-based life insurance application or a request to change the terms of an existing policy via a customer terminal 230, the customer may be prompted with a notification that the insurance provider intends to review other life insurance policy data associated with the customer as part of the processing procedure. The customer may be prompted to accept this condition (e.g., by clicking a check-box or other user interface component, signing an application form, verbal agreement over a phone call, etc.).

If authorization has not been provided by the customer to retrieve the customer's life insurance data (302:No), then the customer's life insurance data will not be retrieved in step 303 and the example process shown in FIG. 3 will be terminated. In some cases, a life insurance provider may require that a customer provide authorization to retrieve the customer's life insurance data as a condition for obtaining a new life insurance policy or modifying the terms of an existing policy. In such cases, if the customer refuses to allow an insurance provider to retrieve the customer's life insurance data from one or more life insurance databases (302:No), then the insurance provider may automatically reject the customer's insurance application or change request. In other examples, the insurance provider may require additional information (e.g., additional verifications of the user's financial data, personal data, medical records, etc.) if the customer refuses to allow the insurance provider to retrieve the customer's other life insurance data (302:No).

In step 303, life insurance policy data corresponding to the customer may be retrieved from one or more databases and analyzed, for example, by an insurance provider server 220 and/or life insurance clearinghouse computing device 210. Examples of life insurance policy data are illustrated in FIGS. 5 and 6. In FIG. 5, table 500 corresponds to an example life insurance policy database table in which each record 501-506 represents a life insurance policy that is currently in-force (i.e., legally binding on the insurer). In this example, the life insurance policy table 500 includes a customer identifier column, an insurance provider identifier column, a policy date column, a policy type column, and a policy amount column. As illustrated in table 500, "Customer A" has obtained three life insurance policies that are currently in-force from three different insurance providers, "Customer B" has obtained two life insurance policies that are currently in-force from a single insurance provider, and "Customer C" has obtained a single life insurance policy that is currently in-force from a single insurance provider.

In FIG. 6, table 600 corresponds to an example life insurance customer database table in which each record 601-603 represents a customer that currently has one or more in-force life insurance policies. In this example, the life insurance customer table 600 includes a customer identifier column, a column indicating the number of current in-force life insurance policies for the customer, a column listing the insurance providers of the customer's in-force life insurance policies, and the combined total policy amounts of the customer's in-force life insurance policies. Table 600 is an alternative view of the same example life insurance policy data shown in table 500, illustrating that "Customer A" has three in-force life insurance policies from three different insurance providers for a total policy amount of $4 million, "Customer B" has two in-force life insurance policies from a single insurance provider for a total policy amount of $4.5 million, and "Customer C" has one in-force life insurance policy from a single insurance provider for a total policy amount of $0.5 million.

In order to retrieve the customer's life insurance policy data in step 303, the insurance provider server 220 (and/or life insurance clearinghouse computing device 210) may first determine one or more customer identifiers that may be used to identify and retrieve data from the clearinghouse 210. For example, the customer's life insurance application or policy change request submitted to an insurance provider server 220 in step 301 may include the customer's name, email address, policy number, social security number, and/or other customer identifying information. From the information received in step 301, the insurance provider server 220 may be configured to select one or more specific data fields that are used by the clearinghouse 210 for storing and compiling customer data. For example, the clearinghouse 210 may store customer life insurance data based on a customer's name, date of birth, and/or social security number, but not by the customer's driver's license number (which may be temporary and formatted differently in different states), insurance policy number (which may be formatted differently for different insurance providers 220), or address, phone number, or email address (which may be associated with multiple different customers). In this example, the insurance provider server 220 may extract the data fields used by the clearinghouse 210 to store and organize customer insurance data, and may submit those customer identifiers fields to the clearinghouse 210 (e.g., in a database query or other information request) to retrieve any life insurance data stored in the clearinghouse 210 for the customer. In some cases, the insurance provider server 220 may need to retrieve customer identifying information to submit to the clearinghouse 210. For instance, if an existing insurance customer logs into the insurance provider server 220 in step 301 using a provider-specific username and password to inquire about obtaining an additional life insurance policy or modifying an existing policy, then the insurance provider server 220 may use the provider-specific username and password to retrieve the user's name, social security number, and/or other customer data that will be recognized by the clearinghouse 210.

When retrieving life insurance data corresponding to the customer in step 303, the retrieved data may correspond to a set of insurance policy records (e.g., records 501-506 in FIG. 5) or to summary record(s) for the customer (e.g., records 601-603 in FIG. 6). The insurance data retrieved from the clearinghouse 210 for a customer may include one or more of: a number of currently in-force life insurance policies associated with the customer, a number of previous (i.e., no longer in-force) life insurance policies associated with the customer, a combined total policy value of the in-force life insurance policies associated with the customer, a listing of the policy types and various terms of the in-force life insurance policies associated with the customer, and/or a listing of the insurance providers associated with the in-force life insurance policies of the customer. As discussed above, it may be advantageous in some cases for the clearinghouse 210 to provide only the raw life insurance policy data (e.g., FIG. 5) from which the insurance provider server 220 may analyze to determine any of the above information, while in other cases it may be advantageous for the clearinghouse 210 to analyze and re-organize the policy data into life insurance customer summary data (e.g., FIG. 6).

After retrieving the customer's life insurance policy data from the clearinghouse 210 in step 303, this data may be analyzed and used to perform one or more life insurance determinations and actions. In various examples, a customer's life insurance policy data retrieved from a clearinghouse 210 may be used to select one or more life insurance products (e.g., a policy types, terms, coverage amounts, etc.) that will be offered to the customer, or to determine a maximum life insurance policy amount for which the customer is eligible.

In the example shown in FIG. 3, the analysis of the customer's life insurance policy data in step 303 may correspond to analyzing and processing a new life insurance application, or a request to modify the terms of an existing life insurance policy, submitted by the customer in step 301. In this example, the insurance provider server 220 (and/or the clearinghouse 210) may use the customer's life insurance policy data retrieved from a clearinghouse 210 to determine a maximum combined life insurance policy amount associated with the customer. The maximum combined life insurance policy amount may be calculated by an insurance provider server 220 based on various customer information such as the customer's age, gender, height, marital status, occupation, income, medical records, eating and drinking behaviors, exercise habits, etc. Different life insurance providers 220 may use different processes and algorithms to determine maximum combined life insurance policy amount for a customer, and thus different providers may calculate different maximum amounts for the same customer. For instance, one or more software modules or algorithms at an insurance provider 220 may determine that a customer (e.g., "Customer A") has a maximum combined life insurance policy amount of $5 million. Based on this calculation, the insurance provider 220 may determine that the customer will not be offered any new life insurance policy, or any modification to an existing policy, that causes the customer's total combined life insurance policy coverage amount to exceed $5 million.

In step 304, the insurance provider server 220 may use customer's life insurance policy data retrieved from a clearinghouse 210 to determine if the amount of the additional life insurance coverage requested in step 301 (e.g., in an application for a new policy or request to increase coverage in an existing policy) will cause the customer to exceed the maximum combined life insurance policy amount determined in step 303. Referring to the previous example, if Customer A has a calculated maximum combined life insurance policy amount of $5 million, and has $4 million in currently in-force life insurance policies (see FIG. 6, record 601), then the insurance provider server 220 may reject any life insurance application for the customer, or any request to increase coverage on the customer's existing policies, that is greater than $1 million. Thus, if the requested additional life insurance policy coverage amount will not exceed the customer's maximum combined life insurance policy amount (304:No), then the insurance provider server 220 may accept the life insurance application or the requested policy change in step 305. On the other hand, if the requested additional life insurance policy coverage amount will exceed the customer's maximum combined life insurance policy amount (304:Yes), then the insurance provider server 220 may reject the life insurance application or request policy change in step 306.

Although the example shown in FIG. 3 relates to receiving and processing an application for a new life insurance policy or a request to change the terms of an existing life insurance policy, and determining whether to accept or reject the application or request based on the customer's life insurance policy data retrieved from the clearinghouse 210, similar techniques may be used to perform other life insurance-related determinations and actions. In some embodiments, an insurance provider server 220 may retrieve a customer's life insurance policy data from the clearinghouse 210 in order to determine one or more specific life insurance policies (e.g., life insurance policy types, premiums, terms, and/or coverage amounts) for which the customer may be eligible and that may be offered to the customer.

Additionally, although the example shown in FIG. 3 relates to determining and enforcing a maximum combined life insurance policy amount for a customer, similar techniques may be used in other examples to determine and enforce maximum combined life insurance policy amounts for groups of individuals (e.g., spouses, nuclear or extended families, or members of a business or organization). For instance, an insurance provider 220 may determine a maximum combined life insurance policy amount for a married couple, a family, a set of business partners, etc., and may enforce the maximum by retrieving and summing the current in-force life insurance policy coverage amounts for each of the individuals in the group, using similar techniques to those described above.

Figure 4:
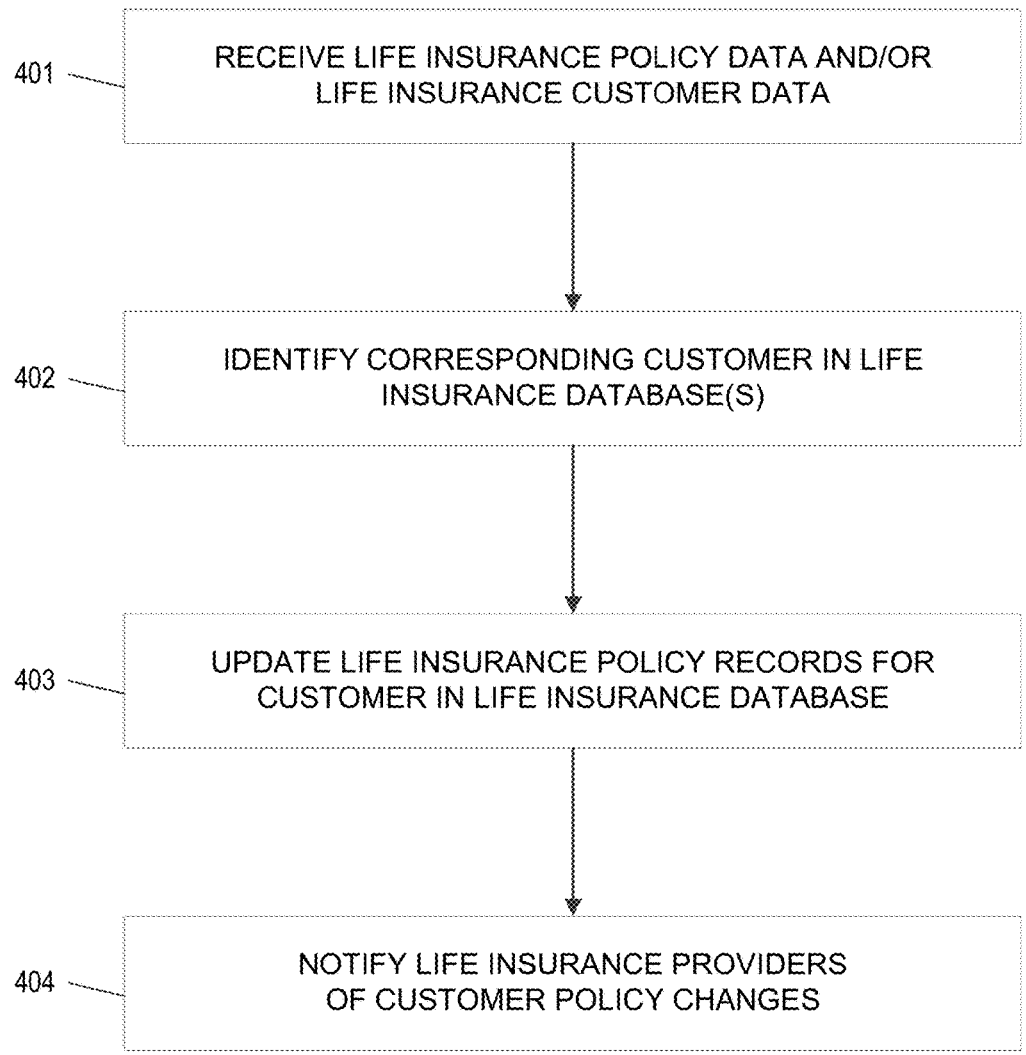
FIG. 4 is a flow diagram illustrating an example of updating a life insurance database based on received life insurance customer data or policy data, according to one or more aspects of the disclosure.

Referring now to FIG. 4, a flow diagram is shown illustrating a process of updating a life insurance database (e.g., in a life insurance clearinghouse 210) based on life insurance policy data or customer data received from a life insurance provider. Various embodiments and examples described below in connection with FIG. 4 may be performed by a computing device in a life insurance clearinghouse system (e.g., a life insurance clearinghouse application server, web server, and/or database server) in response to data received from an insurance provider 220 (e.g., insurance provider server 220).

In step 401, life insurance policy data and/or customer data may be received by a computing device in a life insurance clearinghouse 210 from an insurance provider server 220. For example, the life insurance data received in step 401 may correspond to a new life insurance policy issued by an insurance provider 220 to a customer. In this case, the insurance provider server 220 may transmit an indication of the new policy along with various customer information and policy information (e.g., a customer name or other identifiers, an insurance provider name or other identifier, the policy type, one or more policy terms, and the policy amount, etc.). The various customer information and policy information may correspond to the life insurance data stored in the database(s) of the clearinghouse 210, thereby allowing the clearinghouse to add the new policy information to its databases in step 403.

In other examples, the life insurance data received in step 401 may correspond to an indication that an existing life insurance policy has been changed or canceled. For example, if a customer cancels a life insurance policy, ceases making premium payments, or if a term life insurance policy expires, an insurance provider server 220 may inform the clearinghouse 210 in step 401 that the life insurance policy is no longer in-force. In these examples, the policy data transmitted from the insurance provider server 220 may identify the life insurance policy that was canceled or deactivated, the customer, the policy amount, and/or other terms of the life insurance policy. In other cases, an insurance provider server 220 may inform the clearinghouse 210 that an existing life insurance policy has been changed (e.g., the coverage amount of the policy has been raised or lowered).

As discussed above, specialized hardware and/or software for security and integration may be used for communications between the life insurance clearinghouse 210 and life insurance providers 220 or other external devices or systems. Thus, the life insurance data received in step 401 may comprise data files transferred in accordance with a filed-based integration scheme implemented for the life insurance clearinghouse 210 (e.g., via SFTP or FTP with PGP encryption, etc.), or may be received via a web service in accordance with a service-based integration scheme provided by a security and integration layer 106 (e.g., using SSL or TLS, HTTP or HTTPS, SOAP with XML encryption, etc.). Additionally, the data in step 401 may be transmitted in accordance with an ACCORD standard (e.g., ACCORD XML) or other predetermined format suitable for transmitting insurance data between the life insurance clearinghouse 210 and various insurance providers 220 or other external systems.

In step 402, the clearinghouse computing device may identify one or more customers in the life insurance databases of the clearinghouse 210 that correspond to the updated policy or customer data received in step 401. As discussed above in reference to step 303, insurance provider servers 220 may be configured to transmit certain types of customer identifiers (e.g., customer name, date of birth, social security number, etc.) that are used by the clearinghouse 210 for storing and maintaining life insurance data for customers. Thus, if the insurance provider server 220 transmits an appropriate type of customer identifier in step 401, then the clearinghouse 210 may use the customer identifier to retrieve and update the life insurance databases in the clearinghouse 210.

However, in some examples, an insurance provider server 220 may transmit customer identifier information in step 401 that is not recognized by and/or stored by the clearinghouse 210. For instance, an insurance provider server 220 might only have provider-specific identifier data (e.g., the customer's provider-specific username and password, the customer's policy number with the provider, etc.). In such cases, the clearinghouse 210 may attempt to determine the customer's identity using the provider-specific data, for example, using a look-up table of provider-specific customer identifiers stored at the clearinghouse 210. In other cases, the clearinghouse 210 may transmit a request back to the insurance provider server 220 for the specific customer identifier data used by the clearinghouse 210 for storing and organizing data (e.g., customer name, date of birth, social security number, etc.).

In step 403, the clearinghouse 210 may update one or more life insurance policy records and/or customer records in its life insurance database(s) based on the data received in step 401. For example, referring again to FIGS. 5 and 6, if the life insurance data received in step 401 indicates that Customer A has obtained a new life insurance policy from Provider Z, in the amount of $2.5 million, then in step 403 the clearinghouse 210 may add a new data record into table 500 (FIG. 5) for Customer A's new policy, and may update data record 601 (FIG. 6) to reflect that Customer A now has four in-force life insurance policies from three providers for combined total of $6.5 million. As another example, if the life insurance data received in step 401 indicates that Customer B has canceled the whole life insurance policy for $3 million, then in step 403 the clearinghouse 210 may remove data record 504 from table 500 (FIG. 5) for Customer B's canceled policy, and may update data record 602 (FIG. 6) to reflect that Customer B now has only one in-force life insurance policy from one provider for a total of $1.5 million.

In step 404, the clearinghouse 210 may notify one or more insurance providers based on the updates to the customer life insurance policy data in the clearinghouse 210. For example, if a customer obtains a new life insurance policy, or changes or cancels an existing life insurance policy, the clearinghouse 210 may be configured to notify all other insurance providers 220 that still have current in-force life insurance policies with the customer. In such examples, one or more computing devices of the clearinghouse 210 may transmit automated notifications (e.g., emails or other notifications) to each associated insurance provider server 220. In some embodiments, the notifications in step 404 may be optional and might not be supported by the clearinghouse 210 and/or the insurance provider servers 220. In certain cases, each insurance provider server 220 may be required to register with the clearinghouse 210 to receive such notifications.

The examples described above in FIG. 4 relates to updating one or more life insurance database(s) of a clearinghouse 210 based on information received from an insurance provider 220. However, in other examples, life insurance database(s) in a clearinghouse 210 may be updated based on information received from other sources, or may be updated automatically in response to various events occurring at or detected by the clearinghouse 210. For instance, a customer terminal 230 may communicate directly with the life insurance clearinghouse 210 to inform the clearinghouse 210 that the customer has obtained a new policy, canceled a policy, or that the terms of an existing policy have changed. In other cases, the clearinghouse 210 may receive similar indications from third-parties to the life insurance policies, such the customer's employer, a government agency, or other third-party that is informed of any change in the customer's life insurance policies.

In other examples, the databases within a life insurance clearinghouse 210 also may be updated in response to receiving certain customer information, rather than only policy information. For example, the clearinghouse 210 may receive information from an insurance provider 220, customer 230, government agency, or other data source, that indicates that different records in the life insurance database that were thought to pertain to two different customers are actually associated with a single customer, or vice versa. This example may occur when the clearinghouse 210 or other party determines that a first customer (e.g., "Firstname Lastname") of a first insurance provider 220a and a second customer (e.g., "Firstname A. Lastname") of a second insurance provider 220b, refer to the same individual. This determination may be made by receiving additional customer data (e.g., addresses, social security numbers, etc.) from one or more insurance providers 220, customers 230, government agencies, or other data sources. After receiving such information in step 401, the life insurance clearinghouse 210 may be configured to update and combine the customer life insurance policy data for the two customers. Similarly, if two different life insurance customers having similar identifying information were previously thought to correspond to a single individual, the life insurance clearinghouse 210 may be configured to split the customer life insurance policy data for the single customer into two customers.

Additionally, the life insurance clearinghouse 210 may implement one or more functions or triggers to review and update the life insurance data within its database(s) automatically, without receiving any new additional information. For example, the life insurance clearinghouse 210 may be configured to automatically update its life insurance data to remove term life insurance policies when the expiration dates for those policies are reached. In other examples, the clearinghouse 210 may be configured to leave term life insurance policies in the life insurance databases of the clearinghouse 210 until it receives confirmation from the insurance provider (e.g., via server 220) or the customer (e.g., via terminal 230) that a term life insurance policy is no longer in force.

Although the examples above relate to various embodiments and implementations of life insurance clearinghouses, similar systems, and techniques may be used for other types of insurance, such as health insurance, vehicle insurance, home insurance, etc. For instance, similar systems and methods may be used to store and analyze insurance policy data and customer data for other types of insurance policies. Insurance data such as health insurance data, vehicle insurance data, or home insurance data may be stored and maintained in a vehicle, health, or home insurance clearinghouse comprising one or more insurance databases. Such clearinghouses may store, for example, customer data, vehicle data, and/or home data, policy types, terms, and coverage amounts for sets of health insurance policies, vehicle insurance policies, and/or home insurance policies. Such health, vehicle, or home insurance clearinghouses may include customer and policy data from multiple insurance providers, and may be updated using similar techniques to those described above, for example, when a new policy is obtained, when an existing policy's terms have changed, or when a previous policy is no longer in force. Insurance data may be retrieved from health, vehicle, or home insurance clearinghouses, and may be analyzed and used in various insurance determinations and functions, such as processing applications for new policies, requests to change existing policies, or to determine health, vehicle, or home insurance products for which the customer may be eligible.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

The invention claimed is:

1. A method, comprising:
at a life insurance provider computer server associated with a first life insurance provider, the life insurance provider computer server comprising at least one processor, memory, and a network interface:
receiving, in a first data format, by the at least one processor, via the network interface, and from a customer terminal associated with an existing customer of the first life insurance provider, policy data associated with a request to authorize a transaction by the existing customer of the first life insurance provider to make at least one change to a first life insurance policy provided by the first life insurance provider to the existing customer of the first life insurance provider;
if the existing customer of the first life insurance provider has not provided authorization to retrieve insurance data associated with the existing customer of the first life insurance provider from one or more life insurance databases, causing, by the at least one processor, the request by the existing customer of the first life insurance provider to make the at least one change to the first life insurance policy provided by the first life insurance provider to the existing customer of the first life insurance provider to be rejected;
if the existing customer of the first life insurance provider has provided authorization to retrieve insurance data associated with the existing customer of the first life insurance provider from the one or more life insurance databases:
retrieving, in a second data format comprising a uniform data format, by the at least one processor, via the network interface, and from a life insurance clearinghouse computing device, life insurance data associated with the existing customer of the first life insurance provider, wherein the life insurance data associated with the existing customer of the first life insurance provider indicates that the existing customer of the first life insurance provider has a second life insurance policy provided by a second life insurance provider, the second life insurance policy being different from the first life insurance policy, and the second life insurance provider being different from the first life insurance provider, wherein the life insurance data associated with the existing customer further indicates that a second person related to the existing customer has a third life insurance policy, wherein the life insurance clearinghouse computing device maintains a life insurance clearinghouse database, wherein the life insurance clearinghouse computing device communicates with one or more remote devices via a security and integration layer configured to control access to the life insurance clearinghouse database comprising life insurance policy information received by the life insurance clearinghouse database from at least two different life insurance providers in different data formats, and wherein retrieving, in the second data format, the life insurance data associated with the existing customer of the first life insurance provider comprises:

selecting one or more customer identifiers associated with the existing customer of the first life insurance provider to submit to the life insurance clearinghouse computing device based on one or more specific data fields used by the life insurance clearinghouse computing device in storing and compiling, in the second data format, customer data associated with the life insurance policy information received by the life insurance clearinghouse database from the at least two different life insurance providers, and retrieving customer identifying information based on the one or more selected customer identifiers from a life insurance provider web server configured to provide one or more web-based insurance applications to one or more customer terminals by using a life insurance provider-specific username and password associated with the existing customer of the first life insurance provider to retrieve, from the life insurance provider web server, one or more of a customer name, date of birth, or social security number associated with the existing customer of the first life insurance provider to submit to the life insurance clearinghouse computing device to retrieve the life insurance data associated with the existing customer of the first life insurance provider;

calculating, by the at least one processor, based on demographics of the existing customer and on demographics of the second person related to the existing customer, a maximum combined life insurance policy amount for a group comprising the existing customer of the first life insurance provider and the second person related to the existing customer;

calculating, by the at least one processor, based on the life insurance data associated with the existing customer of the first life insurance provider retrieved from the life insurance clearinghouse computing device, a current amount of in-force life insurance coverage for the group comprising the existing customer of the first life insurance provider and the second person related to the existing customer;

converting, by the at least one processor, the policy data associated with a request by the existing customer of the first life insurance provider, from the first data format to the second data format;

calculating, by the at least one processor, based on the policy data associated with the request by the existing customer of the first life insurance provider to make the at least one change to the first life insurance policy provided by the first life insurance provider to the existing customer of the first life insurance provider, an additional amount of life insurance coverage requested by the existing customer of the first life insurance provider associated with the at least one change to the first life insurance policy provided by the first life insurance provider to the existing customer of the first life insurance provider;

if the current amount of in-force life insurance coverage for the group comprising the existing customer of the first life insurance provider and the second person related to the existing customer, combined with the additional amount of life insurance coverage requested by the existing customer of the first life insurance provider, exceeds the maximum combined life insurance policy amount for the group comprising the existing customer of the first life insurance provider and the second person related to the existing customer, causing, by the at least one processor, the request to authorize the transaction by the existing customer of the first life insurance provider to make the at least one change to the first life insurance policy provided by the first life insurance provider to the existing customer of the first life insurance provider to be rejected; and if the current amount of in-force life insurance coverage for the group comprising the existing customer of the first life insurance provider and the second person related to the existing customer, combined with the additional amount of life insurance coverage requested by the existing customer of the first life insurance provider, does not exceed the maximum combined life insurance policy amount for the group comprising the existing customer of the first life insurance provider and the second person related to the existing customer, causing, by the at least one processor, the request to authorize the transaction by the existing customer of the first life insurance provider to make the at least one change to the first life insurance policy provided by the first life insurance provider to the existing customer of the first life insurance provider to be accepted.

2. The method of claim 1, wherein the policy data associated with the request to authorize the transaction by the existing customer of the first life insurance provider to make the at least one change to the first life insurance policy provided by the first life insurance provider to the existing customer of the first life insurance provider comprises one or more of a name of the existing customer of the first life insurance provider, an address of the existing customer of the first life insurance provider, a phone number of the existing customer of the first life insurance provider, an email address of the existing customer of the first life insurance provider, a driver's license number of the existing customer of the first life insurance provider, a social security number of the existing customer of the first life insurance provider, or a policy number of the existing customer of the first life insurance provider.

3. The method of claim 1, wherein the policy data associated with the request to authorize the transaction by the existing customer of the first life insurance provider to make the at least one change to the first life insurance policy provided by the first life insurance provider to the existing customer of the first life insurance provider is received via a web-based insurance application associated with the first life insurance provider.

4. The method of claim 1, wherein the life insurance data associated with the existing customer of the first life insurance provider retrieved from the life insurance clearinghouse computing device comprises a number of currently in-force life insurance policies associated with the existing customer of the first life insurance provider, a number of previous life insurance policies associated with the existing customer of the first life insurance provider, a combined total policy value of the in-force life insurance policies associated with the existing customer of the first life insurance provider, and a listing of the life insurance providers associated with the in-force life insurance policies of the existing customer of the first life insurance provider.

5. The method of claim 1, wherein the current amount of in-force life insurance coverage for the group comprising the existing customer of the first life insurance provider and the second person related to the existing customer is a sum of a first amount of coverage associated with the first life insurance policy provided by the first life insurance provider, a second amount of coverage associated with the second life insurance policy provided by the second life insurance provider, and a third amount of coverage associated with the third life insurance policy.

6. A system, comprising:
at least one processor;
a network interface; and
memory storing instructions that, when executed by the at least one processor, cause the system to:
receive, in a first data format, via the network interface, and from a customer terminal associated with an existing customer of a first life insurance provider, policy data associated with a request to authorize a transaction by the existing customer of the first life insurance provider to make at least one change to a first life insurance policy provided by the first life insurance provider to the existing customer of the first life insurance provider;
if the existing customer of the first life insurance provider has not provided authorization to retrieve insurance data associated with the existing customer of the first life insurance provider from one or more life insurance databases, cause the request by the existing customer of the first life insurance provider to make the at least one change to the first life insurance policy provided by the first life insurance provider to the existing customer of the first life insurance provider to be rejected;
if the existing customer of the first life insurance provider has provided authorization to retrieve insurance data associated with the existing customer of the first life insurance provider from the one or more life insurance databases:
retrieve, in a second data format comprising a uniform data format, via the network interface, and from a life insurance clearinghouse computing device, life insurance data associated with the existing customer of the first life insurance provider, wherein the life insurance data associated with the existing customer of the first life insurance provider indicates that the existing customer of the first life insurance provider has a second life insurance policy provided by a second life insurance provider, the second life insurance policy being different from the first life insurance policy, and the second life insurance provider being different from the first life insurance provider, wherein the life insurance data associated with the existing customer further indicates that a second person related to the existing customer has a third life insurance policy, wherein the life insurance clearinghouse computing device maintains a life insurance clearinghouse database, wherein the life insurance clearinghouse computing device communicates with one or more remote devices via a security and integration layer configured to control access to the life insurance clearinghouse database comprising life insurance policy information received by the life insurance clearinghouse database from at least two different life insurance providers in different data formats, and wherein retrieving, in the second data format, the life insurance data associated with the existing customer of the first life insurance provider comprises:
selecting one or more customer identifiers associated with the existing customer of the first life insurance provider to submit to the life insurance clearinghouse computing device based on one or more specific data fields used by the life insurance clearinghouse computing device in storing and compiling, in the second data format, customer data associated with the life insurance policy information received by the life insurance clearinghouse database from the at least two different life insurance providers, and
retrieving customer identifying information based on the one or more selected customer identifiers from a life insurance provider web server configured to provide one or more web-based insurance applications to one or more customer terminals by using a life insurance provider-specific username and password associated with the existing customer of the first life insurance provider to retrieve, from the life insurance provider web server, one or more of a customer name, date of birth, or social security number associated with the existing customer of the first life insurance provider to submit to the life insurance clearinghouse computing device to retrieve the life insurance data associated with the existing customer of the first life insurance provider;

calculate, based on demographics of the existing customer and on demographics of the second person related to the existing customer, a maximum combined life insurance policy amount for a group comprising the existing customer of the first life insurance provider and the second person related to the existing customer;

calculate, based on the life insurance data associated with the existing customer of the first life insurance provider retrieved from the life insurance clearinghouse computing device, a current amount of in-force life insurance coverage for the group comprising the existing customer of the first life insurance provider and the second person related to the existing customer;

converting, the policy data associated with a request by the existing customer of the first life insurance provider, from the first data format to the second data format;

calculate, based on the policy data associated with the request by the existing customer of the first life insurance provider to make the at least one change to the first life insurance policy provided by the first life insurance provider to the existing customer of the first life insurance provider, an additional amount of life insurance coverage requested by the existing customer of the first life insurance provider associated with the at least one change to the first life insurance policy provided by the first life insurance provider to the existing customer of the first life insurance provider;

if the current amount of in-force life insurance coverage for group comprising the existing customer of the first life insurance provider and the second person related to the existing customer, combined with the additional amount of life insurance coverage requested by the existing customer of the first life insurance provider, exceeds the maximum combined life insurance policy amount for the group comprising the existing customer of the first life insurance provider and the second person related to the existing customer, cause the request to authorize the transaction by the existing customer of the first life insurance provider to make the at least one change to the first life insurance policy provided by the first life insurance provider to the existing customer of the first life insurance provider to be rejected; and if the current amount of in-force life insurance coverage for the group comprising the existing customer of the first life insurance provider and the second person related to the existing customer, combined with the additional amount of life insurance coverage requested by the existing customer of the first life insurance provider, does not exceed the maximum combined life insurance policy amount for the group comprising the existing customer of the first life insurance provider and the second person related to the existing customer, cause the request to authorize the transaction by the existing customer of the first life insurance provider to make the at least one change to the first life insurance policy provided by the first life insurance provider to the existing customer of the first life insurance provider to be accepted.

7. The system of claim 6, wherein the policy data associated with the request to authorize the transaction by the existing customer of the first life insurance provider to make the at least one change to the first life insurance policy provided by the first life insurance provider to the existing customer of the first life insurance provider comprises one or more of a name of the existing customer of the first life insurance provider, an address of the existing customer of the first life insurance provider, a phone number of the existing customer of the first life insurance provider, an email address of the existing customer of the first life insurance provider, a driver's license number of the existing customer of the first life insurance provider, a social security number of the existing customer of the first life insurance provider, or a policy number of the existing customer of the first life insurance provider.

8. The system of claim 6, wherein the policy data associated with the request to authorize the transaction by the existing customer of the first life insurance provider to make the at least one change to the first life insurance policy provided by the first life insurance provider to the existing customer of the first life insurance provider is received via a web-based insurance application associated with the first life insurance provider.

9. The system of claim 6, wherein the life insurance data associated with the existing customer of the first life insurance provider retrieved from the life insurance clearinghouse computing device comprises a number of currently in-force life insurance policies associated with the existing customer of the first life insurance provider, a number of previous life insurance policies associated with the existing customer of the first life insurance provider, a combined total policy value of the in-force life insurance policies associated with the existing customer of the first life insurance provider, and a listing of the life insurance providers associated with the in-force life insurance policies of the existing customer of the first life insurance provider.

10. The system of claim 6, wherein the current amount of in-force life insurance coverage for the group comprising the existing customer of the first life insurance provider and the second person related to the existing customer is a sum of a first amount of coverage associated with the first life insurance policy provided by the first life insurance provider, a second amount of coverage associated with the second life insurance policy provided by the second life insurance provider, and a third amount of coverage associated with the third life insurance policy.

11. One or more non-transitory computer-readable media storing instructions that, when executed by a computer system comprising at least one processor, memory, and a network interface, cause the computer system to:

receive, in a first data format, via the network interface, and from a customer terminal associated with an existing customer of a first life insurance provider, policy data associated with a request to authorize a transaction by the existing customer of the first life insurance provider to make at least one change to a first life insurance policy provided by the first life insurance provider to the existing customer of the first life insurance provider;

if the existing customer of the first life insurance provider has not provided authorization to retrieve insurance data associated with the existing customer of the first life insurance provider from one or more life insurance databases, cause the request by the existing customer of the first life insurance provider to make the at least one change to the first life insurance policy provided by the first life insurance provider to the existing customer of the first life insurance provider to be rejected;

if the existing customer of the first life insurance provider has provided authorization to retrieve insurance data associated with the existing customer of the first life insurance provider from the one or more life insurance databases:

retrieve, in a second data format comprising a uniform data format, via the network interface, and from a life insurance clearinghouse computing device, life insurance data associated with the existing customer of the first life insurance provider, wherein the life insurance data associated with the existing customer of the first life insurance provider indicates that the existing customer of the first life insurance provider has a second life insurance policy provided by a second life insurance provider, the second life insurance policy being different from the first life insurance policy, and the second life insurance provider being different from the first life insurance provider, wherein the life insurance data associated with the existing customer of the first life insurance provider further indicates that a second person related to the existing customer has a third life insurance policy, wherein the life insurance clearinghouse computing device maintains a life insurance clearinghouse database, wherein the life insurance clearinghouse computing device communicates with one or more remote devices via a security and integration layer configured to control access to the life insurance clearinghouse database comprising life insurance policy information received by the life insurance clearinghouse database from at least two different life insurance providers in different data formats, and wherein retrieving, in the second data format, the life insurance data associated with the existing customer of the first life insurance provider comprises:

selecting one or more customer identifiers associated with the existing customer of the first life insurance provider to submit to the life insurance clearinghouse computing device based on one or more specific data fields used by the life insurance clearinghouse computing device in storing and compiling customer data associated with the life insurance policy information received by the life insurance clearinghouse database from the at least two different life insurance providers, and retrieving customer identifying information based on the one or more selected customer identifiers from a life insurance provider web server configured to provide one or more web-based insurance applications to one or more customer terminals by using a life insurance provider-specific username and password associated with the existing customer of the first life insurance provider to retrieve, from the life insurance provider web server, one or more of a customer name, date of birth, or social security number associated with the existing customer of the first life insurance provider to submit to the life insurance clearinghouse computing device to retrieve the life insurance data associated with the existing customer of the first life insurance provider;

calculate, based on demographics of the existing customer and on demographics of the second person related to the existing customer, a maximum combined life insurance policy amount for a group comprising the existing customer of the first life insurance provider and the second person related to the existing customer;

calculate, based on the life insurance data associated with the existing customer of the first life insurance provider retrieved from the life insurance clearinghouse computing device, a current amount of in-force life insurance coverage for the group comprising the existing customer of the first life insurance provider and the second person related to the existing customer;

converting, the policy data associated with a request by the existing customer of the first life insurance provider, from the first data format to the second data format;

calculate, based on the policy data associated with the request by the existing customer of the first life insurance provider to make the at least one change to the first life insurance policy provided by the first life insurance provider to the existing customer of the first life insurance provider, an additional amount of life insurance coverage requested by the existing customer of the first life insurance provider associated with the at least one change to the first life insurance policy provided by the first life insurance provider to the existing customer of the first life insurance provider;

if the current amount of in-force life insurance coverage for the group comprising the existing customer of the first life insurance provider and the second person related to the existing customer, combined with the additional amount of life insurance coverage requested by the existing customer of the first life insurance provider, exceeds the maximum combined life insurance policy amount for the group comprising the existing customer of the first life insurance provider and the second person related to the existing customer, cause the request to authorize the transaction by the existing customer of the first life insurance provider to make the at least one change to the first life insurance policy provided by the first life insurance provider to the existing customer of the first life insurance provider to be rejected; and if the current amount of in-force life insurance coverage for the group comprising the existing customer of the first life insurance provider and the second person related to the existing customer, combined with the additional amount of life insurance coverage requested by the existing customer of the first life insurance provider, does not exceed the maximum combined life insurance policy amount for the existing customer of the first life insurance provider, cause the request to authorize the transaction by the existing customer of the first life insurance provider to make the at least one change to the first life insurance policy provided by the first life insurance provider to the existing customer of the first life insurance provider to be accepted.

12. The method of claim 1, wherein the security and integration layer comprises one or more dedicated web servers and network hardware operating at a physical location at which the life insurance clearinghouse computing device is also operated.

13. The method of claim 1, wherein the security and integration layer implements a file-based integration scheme in which one or more data files are transmitted to and from the life insurance clearinghouse computing device through the security and integration layer using one or more network communication protocols.

14. The method of claim 1, wherein the security and integration layer implements a service based integration scheme in which one or more web services are accessed by authorized external devices to support input, extraction, and manipulation of data maintained by the life insurance clearinghouse computing device.

15. The method of claim 1, wherein the life insurance clearinghouse computing device is configured to:
   receive, from the life insurance provider computer server, data indicating that an existing life insurance policy has been changed or canceled;
   identify one or more customers corresponding to the existing life insurance policy that has been changed or canceled; and
   update one or more life insurance policy records maintained by the life insurance clearinghouse computing device in the life insurance clearinghouse database based on the data indicating that the existing life insurance policy has been changed or canceled.

16. The method of claim 15, wherein the life insurance clearinghouse computing device is configured to:
   transmit one or more automated notifications to one or more life insurance provider servers based on updating the one or more life insurance policy records maintained by the life insurance clearinghouse computing device in the life insurance clearinghouse database based on the data indicating that the existing life insurance policy has been changed or canceled.

17. The method of claim 1, wherein the life insurance clearinghouse computing device is configured to automatically update one or more life insurance policy records maintained by the life insurance clearinghouse computing device in the life insurance clearinghouse database to remove one or more term life insurance policies when one or more expiration dates corresponding to the one or more term life insurance policies are reached.

18. The method of claim 1, wherein the second person related to the existing customer is a member of a family of the existing customer, an associate of a business of the existing customer, or a member of an organization including the existing customer.

19. The method of claim 18, wherein the group comprising the existing customer and the second person related to the existing customer is the family, the business, or the organization.

* * * * *